United States Patent
Aerts et al.

(10) Patent No.: US 8,241,495 B2
(45) Date of Patent: Aug. 14, 2012

(54) FILTRATION MODULE INCLUDING MEMBRANE SHEET WITH CAPILLARY CHANNELS

(75) Inventors: Peter E. M. Aerts, Midland, MI (US); David J. Moll, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 225 days.

(21) Appl. No.: 12/858,805

(22) Filed: Aug. 18, 2010

(65) Prior Publication Data

US 2011/0049038 A1    Mar. 3, 2011

Related U.S. Application Data

(60) Provisional application No. 61/237,725, filed on Aug. 28, 2009.

(51) Int. Cl.
*B01D 33/21* (2006.01)
*B01D 24/00* (2006.01)

(52) U.S. Cl. ........... 210/321.84; 210/500.23; 210/510.1; 210/257.2; 210/321.89; 210/321.75

(58) Field of Classification Search ............. 210/321.75, 210/321.84, 321.69, 321.72, 500.23, 321.78, 210/321.79, 321.8, 321.81, 321.87, 321.88, 210/321.89, 510.1, 257.2; 96/4, 7–10
See application file for complete search history.

(56) References Cited

U.S. PATENT DOCUMENTS

| | | | |
|---|---|---|---|
| 4,176,069 A * | 11/1979 | Metz et al. | 210/321.75 |
| 4,342,723 A * | 8/1982 | Sado et al. | 422/48 |
| 4,756,835 A * | 7/1988 | Wilson | 210/651 |
| 5,046,936 A | 9/1991 | Bourdiol et al. | |
| 5,089,187 A | 2/1992 | Aptel et al. | |
| 5,171,493 A | 12/1992 | Aptel et al. | |
| 5,248,424 A | 9/1993 | Cote et al. | |
| 5,482,625 A | 1/1996 | Shimizu et al. | |
| 5,620,605 A | 4/1997 | Moller | |
| 5,922,201 A * | 7/1999 | Yamamori et al. | 210/321.79 |
| 6,280,626 B1 | 8/2001 | Miyashita et al. | |
| 6,287,467 B1 | 9/2001 | Nagano et al. | |
| 6,381,846 B2 | 5/2002 | Insley et al. | |
| 6,787,216 B1 | 9/2004 | Koenhen | |
| 7,279,215 B2 | 10/2007 | Hester et al. | |
| 8,114,478 B1 * | 2/2012 | Koreltz et al. | 427/245 |
| 2004/0035779 A1 * | 2/2004 | Vossenkaul et al. | 210/321.6 |

(Continued)

FOREIGN PATENT DOCUMENTS

FR    2445163    7/1980

(Continued)

OTHER PUBLICATIONS

Final MBR-Network Workshop, Salient outcomes of the European R&D projects on MBR technology, Mar. 31-Apr. 1, Berlin 2009 (Germany) pp. 237-293.

(Continued)

*Primary Examiner* — Tony G Soohoo
*Assistant Examiner* — David C Mellon
(74) *Attorney, Agent, or Firm* — Edward W. Black

(57) ABSTRACT

A filtration module comprising at least one membrane sheet comprising a plurality of capillary channels in parallel arrangement with each other and which are in fluid communication with a header.

9 Claims, 4 Drawing Sheets

U.S. PATENT DOCUMENTS

| | | | |
|---|---|---|---|
| 2006/0053759 A1 | 3/2006 | Winters et al. | |
| 2006/0292044 A1 | 12/2006 | Ohno et al. | |
| 2008/0156730 A1 | 7/2008 | Heinen | |
| 2008/0164208 A1 | 7/2008 | Doyen et al. | |
| 2009/0011182 A1 | 1/2009 | Mackley et al. | |
| 2010/0200481 A1* | 8/2010 | Nakahara et al. | 210/151 |
| 2011/0111122 A1 | 5/2011 | Mues et al. | |

FOREIGN PATENT DOCUMENTS

| | | |
|---|---|---|
| FR | 2616812 | 12/1988 |
| JP | 59082906 | 5/1984 |
| JP | H8-155275 | 6/1996 |
| JP | 1190192 | 4/1999 |
| JP | 11128692 | 5/1999 |
| JP | 2951189 | 9/1999 |
| JP | 2001205054 | 7/2001 |
| NL | 1009866 | 2/2000 |
| WO | WO 2005056272 A1 * | 6/2005 |
| WO | 2007036332 | 4/2007 |
| WO | WO 2008139617 A1 * | 11/2008 |

OTHER PUBLICATIONS

Grelot et al., Evaluation of a novel flat sheet MBR filtration system., Desalination 236 (2009) 111-119.

Grelot et al., A new and appropriate fibre sheet configuration for MBR technologies., Desalination and Water Treatment 6 (2009) 25-32.

Introduction to membranes—MBRs: Manufacturers' comparison: part 1, Filtration+Separation, Mar. 2008, pp. 28-31.

Introduction to membranes—MBRs: Manufacturers' comparison: part 2—supplier review, Filtration+Separation, Apr. 2008, pp. 30-33.

Introduction to membranes—MBRs: Manufacturers' comparison: part 3—supplier review, Filtration+Separation, May 2008, pp. 1-3.

Kubota MBR brochuree, pp. 1-2.

Microdyn Biocel Brochure, pp. 1-4.

Toray MBR Brochure, pp. 1-2.

Yang et al., State-of-the-are of membrane bioreactors: Worldwide research and commercial applications in North America., Journal of Membrane Science 270 (2006) 201-211.

* cited by examiner

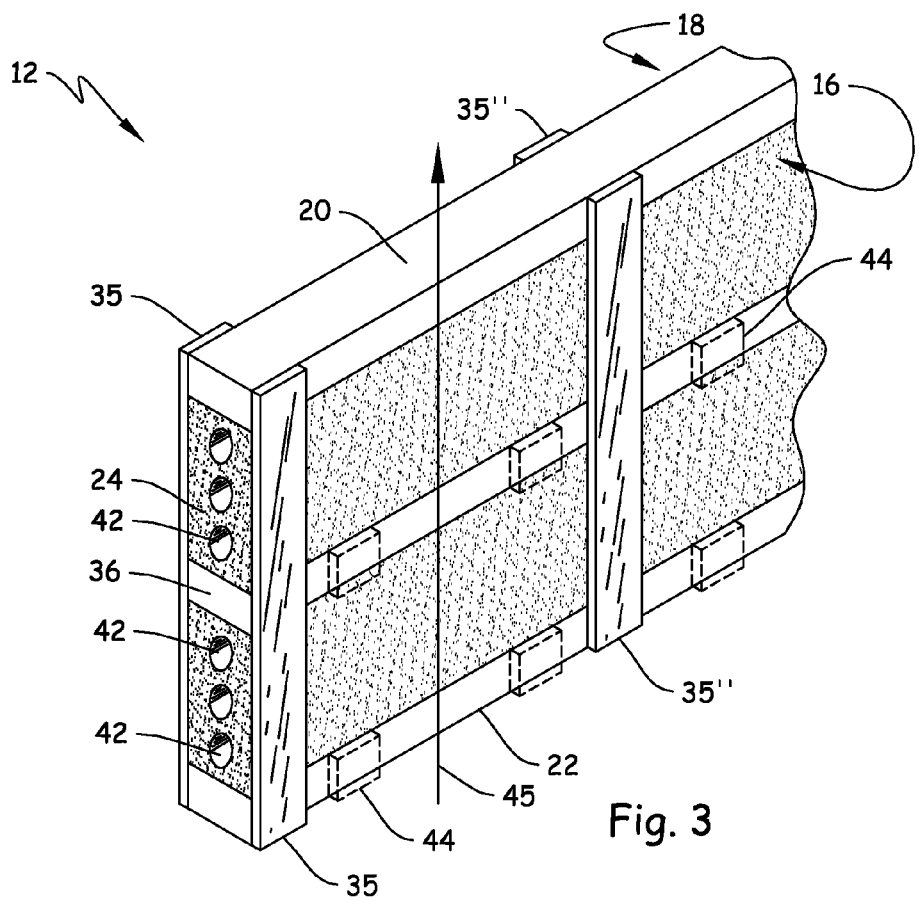
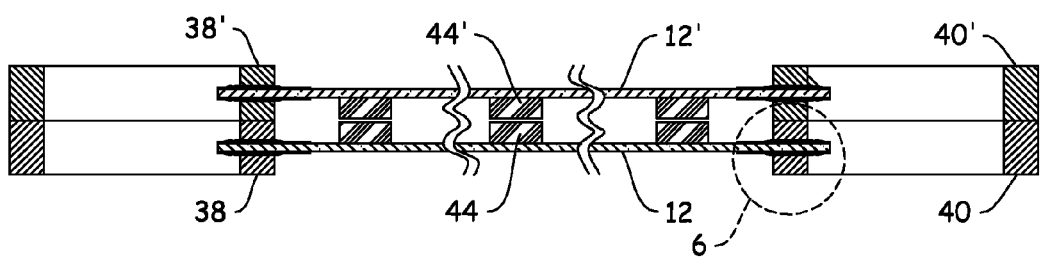
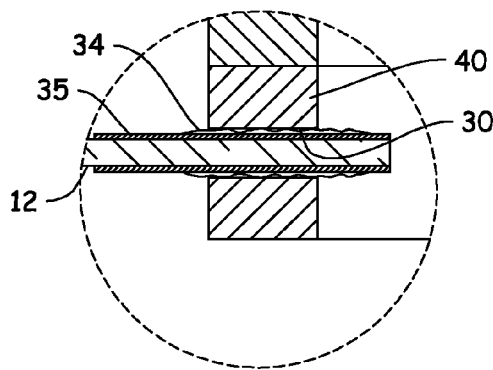

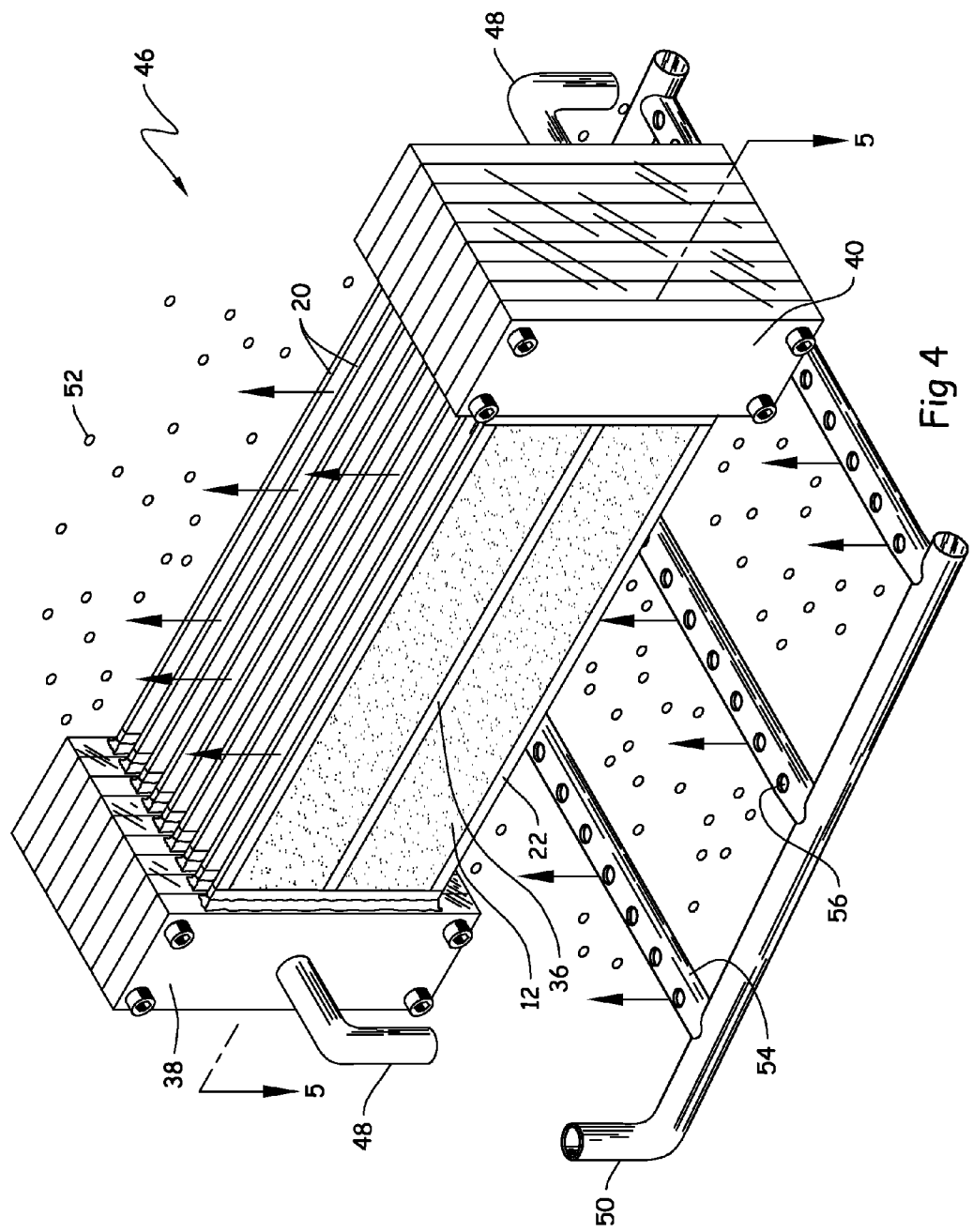

FILTRATION MODULE INCLUDING MEMBRANE SHEET WITH CAPILLARY CHANNELS

CROSS REFERENCE STATEMENT

This application claims the benefit of U.S. Provisional Application No. 61/237,725, filed Aug. 28, 2009, which is incorporated herein by reference.

TECHNICAL FIELD

The present invention is generally directed toward filtration modules including porous polymeric membranes useful for separating solids from liquids. Representative applications for such modules include the purification of water from streams, rivers, ponds and lakes. Other examples include the treatment of municipal and industrial waste water including sewage and settling ponds. Such modules may also find use in membrane bioreactor (MBR) applications.

BACKGROUND ART

Filtration modules for separating solids from liquids commonly utilize micro (MF) or ultra (UF) filtration type porous polymeric membranes having average pore sizes from about 0.005 to 10 microns. Two of the more common types of membranes include porous hollow fibers, (e.g. see JP 11-128692; JP H8-155275; JP 2951189; U.S. Pat. No. 5,248,424), and flat sheet composite membranes (e.g. see US 2008/0156730; US 2008/0164208 and WO 2007/036332). In operation, several modules are often interconnected to form a filtration assembly which is submerged within a water source (i.e. "feed" source) such as a settling pond or an activated sludge basin. Filtration occurs by creating a transmembrane pressure differential across the membrane surface. This is typically accomplished by drawing a vacuum from the permeate side of the membrane or by pressurizing the feed source. As a result of such transmembrane pressure, permeate flows through the pores of the membrane and is collected in a header which is sealed from the feed source. After prolonged use, solids from the feed accumulate upon the membrane surface and restrict or even block fluid flow. Conventionally pore blockage, concentration polarization, and fouling have been addressed by the use of aeration devices that generate gas bubbles which scour the outer surface of the membrane. Another common technique involves backwashing permeate through the membrane to dislodge and remove accumulated solids from the membrane surface.

Another type of flat sheet membrane comprises an integral extruded porous structure including capillary channels. This type of membrane sheet is distinguished from the aforementioned flat sheet composite-type structure in that it has an integral or unitary structure rather than a distinct multi-laminate construction. Examples of such membrane sheets are described in: U.S. Pat. No. 5,046,936; U.S. Pat. No. 5,089,187; U.S. Pat. No. 5,171,493; and US 2009/0011182. Such membranes may be extruded from a variety of polymer mixtures, e.g. polyether sulfone, polyvinylidene fluoride. U.S. Pat. No. 6,787,216; FR 2,616,812; JP 59-082906 and JP 11-90192 further describe the use of such membrane sheets within filtration modules. A. Grelot et al. describes the use of such membrane sheet in filtration modules which are combined to form a filtration assembly designed for MBR applications, see "A New and Appropriate Fibre Sheet Configuration for MBR Technologies," Desalination and Water Treatment, 6, 25-32, Desalination Publications (2009).

STATEMENT OF INVENTION

The invention includes a filtration module comprising at least one membrane sheet comprising a plurality of capillary channels in parallel arrangement with each other and which are in fluid communication with a header. Many additional embodiments are disclosed including filtration assemblies including multiple filtration modules along with methods for making and using the assembly, module and corresponding components.

BRIEF DESCRIPTION OF THE FIGURES

The included figures illustrate several embodiments of the subject filtration module, filtration assembly and selected component parts. The figures are not to scale and include idealized views to facilitate description. Where possible, like numerals have been used throughout the figures and written description to designate the same or similar features.

FIG. 3 is a perspective, partially cut-away view of a membrane sheet.

FIG. 4 is a perspective view of an embodiment of a filtration assembly including a plurality of vertically-aligned filtration modules with headers aligned along the lateral edges of individual membrane sheets and an aeration device located below the filtration modules.

FIG. 5 is a cut-away view taken along line 5-5 of FIG. 4 showing two adjacently positioned, vertically-aligned filtration modules.

FIG. 6 is an enlarged view of FIG. 6 showing two headers aligned and in fluid communication with the lateral edges of two membrane sheets.

DETAILED DESCRIPTION OF THE INVENTION

Figure 1:
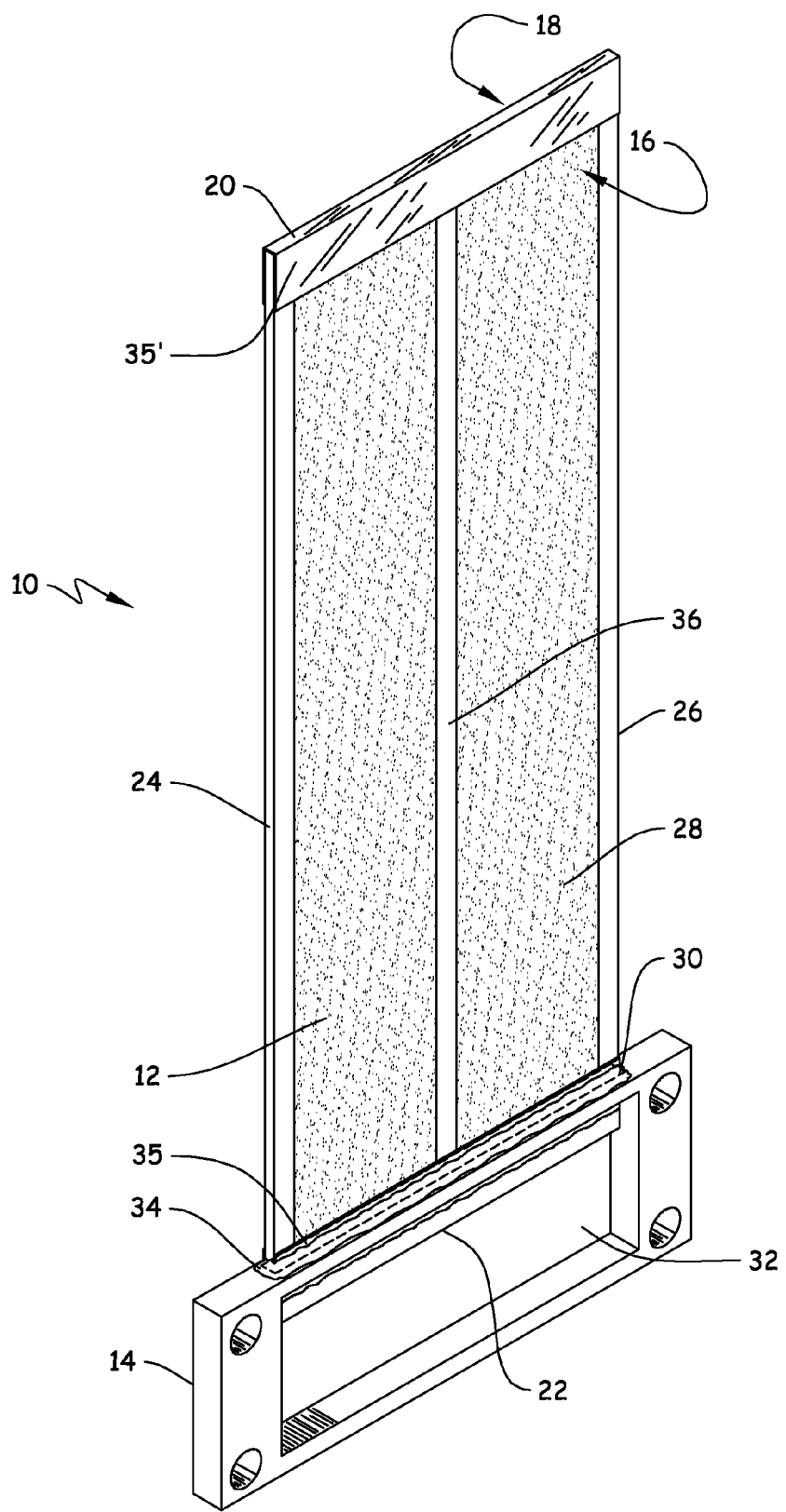
FIG. 1 is a perspective view of one embodiment of a vertically-aligned filtration module including a membrane sheet and header.

Various features and embodiments of the invention are described with reference to the Figures. With reference to FIG. 1, a filtration module is generally shown at 10 including a vertically-aligned membrane sheet (12) and header (14). The membrane sheet includes a first (16) and second (18) opposing outer surface bordered by an opposing top (20) and bottom (22) edge and an opposing first (24) and second (26) lateral edge. As used herein, the term "vertically-aligned" means that the membrane sheet (12) lies in a substantially vertical plane, i.e. the outer surfaces (16, 18) of the membrane sheet (12) lie in substantially vertical planes e.g. varying less than 20 degrees, but preferably less than 10 degrees, and more preferably less than 5 degrees from vertical. While not shown, a plurality of capillary channels are located between the opposing surfaces (16, 18) and extend vertically between the top (20) and bottom (22) edge of the membrane sheet (12). The opposing surfaces (16, 18) of the membrane sheet (12) comprise a porous structure (28) which is in selective fluid communication with the capillary channels (not shown). The header (14) is disposed along the bottom edge (22) of the membrane sheet (12); whereas the other edges (20, 24, 26) of the membrane sheet (12) are all free of a header and unconfined. More specifically, the bottom edge (22) of the membrane sheet (12) is shown disposed through a slot (30) and into a chamber (32) within the header (14). A sealant (34) or potting material such as urethane, epoxy, silicone or hot melt is disposed about the interface between the periphery of the membrane sheet (12) and header (14). The bottom edge (22) of the membrane sheet may optionally include a laminate (35) such as a strip of non-porous tape to protect the membrane sheet from direct contact with the sealant (34) or provide the sheet with support and stress relief along the interface with the header (14). For example, movement of the membrane sheet during filtration can create focused stress points along the membrane sheet in areas adjacent of the sealant (34) and slot (30). The use of a stress relief member such as laminate (35) can reduce such stress points. The capillary channels (not shown) are closed or sealed along the top edge (20) of the membrane sheet by a laminate (35'), such as a strip of tape wrapped around the top edge (20) and extending partially onto both outer surfaces (16, 18). Other means and methods for sealing the capillary channels may be used including but not limited to: the application of sealants, heat crimping, ultra sonic welding, and the like. While not shown, the capillary channels remain open at the bottom edge (22) such that the capillary channels are in fluid communication with the chamber (32) of the header (14). As will be described in more detail with reference to FIG. 3, the membrane sheet (12) may further include a reinforcing strip (36) located between the first (24) and second (26) lateral edges and parallel with the capillary channels (not shown). The reinforcing strip (36) and edges (24, 26) extending parallel with the capillary channels may be made from a different composition, or have a different structure as compared with the bulk section (i.e. the portions of sheet including porous structure and capillary channels and located between the four opposing edges) of the membrane sheet. For example, the reinforcing strip (36) and edges (24, 26) running parallel with the capillary channels preferably include no capillary channels and may also have a non-porous structure. Such strips and edges preferably have tensile strengths at least twice as great as the tensile strength of the "bulk" sections of the membrane sheet.

In operation, the filtration module (10) may be submerged within a tank, pond, or other feed water and a transmembrane pressure is applied across the membrane sheet (12). While not shown in FIG. 1, the header (14) includes covers which encase the chamber (32) and prevent contamination with feed. Solids are separated from feed water as water permeates through the porous structure (28) and enters the capillary channels, and subsequently flows to the chamber (32) within the header (14). Permeate remains isolated from feed water by the fluid tight seal provided by the sealant (34) located about the interface between the periphery of the membrane sheet (12) and header (14). As will be described with reference to FIG. 4, permeate may be removed from the chamber (32) of the header (14) via a fluid connection (not shown).

Figure 2:
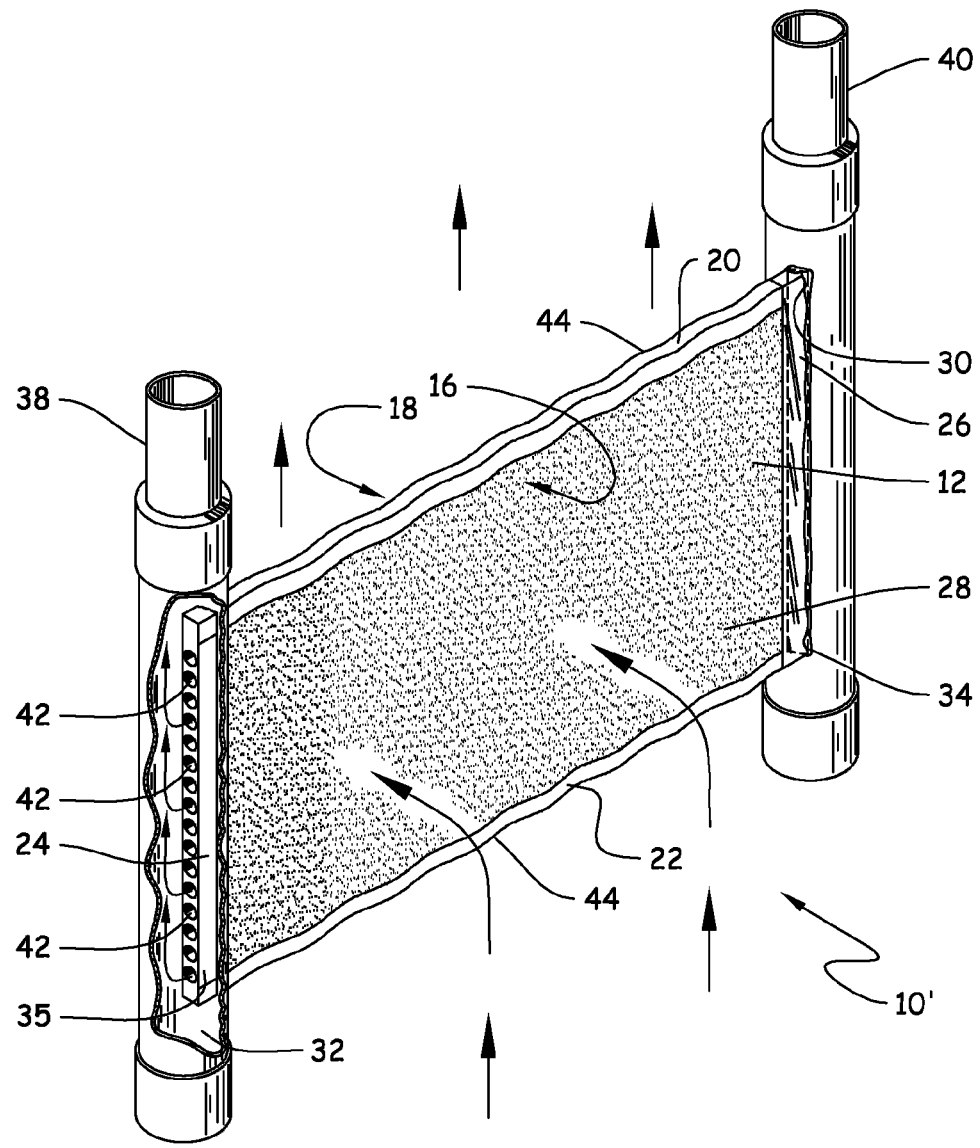
FIG. 2 is a perspective, partially cut-away view of another embodiment of vertically-aligned filtration module comprising a membrane sheet secured between two opposing headers.

FIG. 2 illustrates another embodiment of a filtration module, generally shown at 10' including a vertically positioned first header (38) disposed along the first lateral edge (24) of the membrane sheet (12) and a second vertically positioned header (40) disposed along the second lateral edge (26) of a membrane sheet (12). Capillary channels (42) extend between the first and second lateral edges (24, 26) of the membrane sheet (12). The lateral edges (24, 26) of the membrane sheet (12) are positioned within corresponding slots (30) disposed along the headers (38, 40) and are sealed therein by use of a sealant (34) in a similar manner as described with respect to the embodiment of FIG. 1; however, in the embodiment of FIG. 2 both ends of the capillary channels (42) remain open and in fluid communication with the chambers (32) of the headers (38, 40). A laminate (35), such as a strip of tape may be provided along a portion of the outer surfaces (16, 18) along each lateral edge (24, 26) to protect and provide stress relief to the membrane sheet (12) along the axis of engagement with the headers (38, 40). As with the embodiment illustrated in FIG. 1, the membrane sheet (12) is vertically-aligned and the top edge (20) of the membrane sheet (12) is unconfined by with a header or other structures which would otherwise impede or restrict the pathway of fluid flow vertically upward along the outer surfaces (16, 18) of the membrane sheet (12). That is, while the lateral edges (24, 26) of the membrane sheet (12) are confined by headers (38, 40), the top edge (20) is unconfined so that fluid flow in a pathway vertically upward along the outer surfaces (16, 18) is unimpeded. Unlike the embodiment of FIG. 1, no reinforcing strip is provided.

In operation, the filtration module (10') may be submerged within a tank, pond, or other feed source and a transmembrane pressure applied across the membrane sheet (12), such as by application of suction to the chamber (32). Arrows generally indicate the flow directions of various fluids during operation, including the flow of feed fluid along a flow pathway extending vertically upwardly across the outer surfaces (16, 18) of the membrane sheet. As a result of transmembrane pressure, a portion of the feed liquid permeates the porous structure (28) of the membrane sheet (12) and enters the capillary channels (42) where it subsequently flows to chambers (32) within the headers (38, 40) and is withdrawn via a fluid connection (not shown).

As will be described in connection with FIGS. 4 and 5, a plurality of filtration modules may be assembled in side-by-side arrangement with spacing between vertically-aligned membrane sheets. In order to facilitate spacing between adjacent membrane sheets, at least one edge of the membrane sheet which is unconfined with a header, (e.g. extending parallel to the capillary channels) may include an undulating surface. The undulating surface includes projections which extend outward from the plane defined by outer surfaces (16, 18). That is, while the outer surfaces (16, 18) are relatively flat and uniform, the undulating surface includes portions which project outward. An example of such an undulating surface is illustrated in FIG. 2 along both the top and bottom edges (20, 22) of the membrane sheet (12). As shown, the undulating surface (44) has a sinusoidal or wave pattern; however, other embossed or raised patterns or projections may be used. As will be described in more detail, the undulating surface facilitates spacing between adjacently positioned membrane sheets so that vertical fluid flow is more uniform across the outer surfaces (16, 18) of the membrane sheets. While the embodiment illustrated in FIG. 2 is shown including two vertically positioned headers (38, 40), an alternative embodiment (not shown) may include only one vertically positioned first header (38) in fluid communication with the first lateral edge (24) of the membrane sheet (12) and with the second lateral edge (26) sealed, i.e. with the capillary channels (42) closed along the second lateral edge (26). Such an alternative embodiment is similar to that described in connection with FIG. 1, albeit with a vertically positioned header rather than a horizontally positioned header. However, in both such embodiments, the top edge (20) of membrane sheet (12) remains unconfined, i.e. the top edge is free of a header or other structures which would otherwise impede or restrict vertical fluid flow along the outer surfaces of the membrane sheet (12).

FIG. 3 illustrates an embodiment of a membrane sheet, generally shown at 12. The membrane sheet (12) comprises a first (16) and second (18) opposing outer surfaces bordered by an opposing top (20) and bottom (22) edge and an opposing first (24) and second (not shown) lateral edge. A plurality of parallel capillary channels (42) are located between the outer surfaces (16, 18) and extend between opposite edges of the sheet. The capillary channels extend between the first (24) and second (not shown) lateral edges. As described in connection with the embodiments illustrated in FIGS. 1 and 2, an optional laminate (35) such as narrow length of tape which may be disposed upon a portion of each outer surface (16, 18) along the first lateral edge (24) to protect and provide support to the membrane sheet (12) at the point of engagement with a header (not shown). An optional reinforcing laminate (35") is also shown extending in a direction perpendicular to the capillary channels at a location between the lateral edges. Such a reinforcing laminate provides additional strength and stress relief at locations between the lateral edges of the membrane. The relative dimensions of the edges (20, 22, 24) and reinforcing strip (36) are exaggerated (enlarged) for purposes of illustration. The edges (20, 22, 24) include not only the terminal section lying between the planes defined by the outer surfaces (16, 18), but also a narrow strip along the outer surfaces (16, 18).

FIG. 3 further illustrates a reinforcing strip (36) is located between the top (20) and bottom (22) edges, parallel with the capillary channels (42) and extends from the first lateral edge (24) to the second lateral edge (not shown). The reinforcing strip (36) adds strength, and in some embodiments, rigidity to the membrane sheet. While shown positioned equal distant between the top (20) and bottom (22) edges, the reinforcing strip (36) may be located at other locations, e.g. located nearer the top or bottom edge. Moreover, multiple reinforcing strips may be used—particularly in embodiments where the membrane sheet is relatively long, thin, includes only one header, or where the module is subjected to vigorous air scrubbing. An undulating surface (44) comprising an embossed pattern or raised projections is included along the bottom edge (22). While shown as a wave pattern in the embodiment of FIG. 2, the undulating surface (44) shown in FIG. 3 comprises a plurality of discrete raised projections spaced across the first outer surface (16) of the membrane sheet (12). A similar undulating surface (44) is also provided along the reinforcing strip (36). While not particularly limited, the projections may comprise droplets of a hardened adhesive or other plastic secured to the edge (22). As will be described in more detail with reference to FIG. 4, the undulating surface facilitates spacing between adjacently positioned membrane sheets so that vertical fluid flow (45) is more uniform across the outer surfaces (16, 18) of the membrane sheets. While not shown, a similar undulating surface may be provided upon the reinforcing laminate (35").

The membrane sheet (12) includes a "bulk section" bordered by four opposing edges which comprises at least a major portion of the membrane sheet, e.g. at least 90% of the total volume of the membrane sheet. The bulk section comprises a porous structure (28) which provides selective fluid communication between the opposing outer surfaces (16, 18) and the capillary channels (42) but excludes the edges, reinforcing strip(s) and reinforcing laminate (if present). The bulk section has a tensile strength, i.e. "bulk tensile strength" which is a function of its porous structure and polymer composition. The porous structure (28) is not particularly limited and the morphology, pore size, pore size distribution and porosity are typically a function of the material and manufacturing technique utilized to produce the membrane sheet. In many embodiments, the porous structure is produced by extruding a polymer mixture into a sheet including capillary channels, followed by a phase inversion or separation process which creates the desired porosity. Other well known techniques such as stretching and the use of porogens may also be used. The size and distribution of pores throughout the structure can be controlled via known techniques. Depending upon the end use application, the average pore sizes may range from 0.001 to 100 microns, but in many applications the average pore size will range from 0.01 to 10 microns. The porous structure may be isotropic or anisotropic. The porosity of the porous structure is preferably at least 50%. Polymers useful in preparing such porous structures include: polysulfone, poly(ether sulfone) and poly(vinylidene fluoride). Methods for making such membrane sheets including capillary channels and porous structures are described in WO1981/02750; U.S. Pat. No. 5,046,936; U.S. Pat. No. 5,089,187; U.S. Pat. No. 5,171,493; U.S. Pat. No. 6,787,216 and US 2009/0011182.

At least one and preferably both edges of the membrane sheet which extend in parallel direction with the capillary channels (i.e. "support edges") preferably have a tensile strength at least twice, and more preferably four times as great as the bulk section of the membrane sheet. As used herein, "tensile strength" refers to the maximum stress on the stress-strain curve, (e.g. as measured by taking a small sample with a fixed cross-sectional area and pulling it with a controlled, gradually increasing force). Similarly, any reinforcing strips, if present, preferably also have a tensile strength at least twice, and more preferably four times as great as an equal section (volume) of the bulk section of the membrane sheet. This added strength may be accomplished by a variety of means as described below. In general, the reinforcing strip and support edges (extending parallel to the capillary channels) may be formed by way of a variety of methods including: co-extrusion during the formation of the porous structure making up the bulk section of the membrane sheet, application of a sealant to fill and seal open pores, collapsing or filling the pore structure of a portion of the porous structure by way of pressure (crimping) and/or heat, sonic welding or laser cutting of the porous structure. The reinforcing strip and support edges may have the same or different chemical composition as the bulk section of the membrane sheet. For example, the support edges may be co-extruded using the same polymer mixture as the bulk section of the membrane sheet but without porogens or other constituents responsible for pore formation. Alternatively, the support edges may comprise an entirely different chemical composition. In a preferred embodiment, the support edges are formed via co-extrusion simultaneously with the bulk section, capillary channels and opposing surfaces of the membrane sheet to make an integral extruded structure wherein the support edges and optional reinforcing strip(s) extend thru the entire thickness of the membrane sheet. As used in this context, the phrase "integral extruded structure" means that the structure is made via a simultaneous extrusion processes without separate laminate structures. That is, the bulk section, opposing surfaces, capillary channels and bordering edges (and optional reinforcing strips) of the membrane sheet are part of a unitary structure which is created as part of a simultaneous extrusion process. Regardless of their chemical composition and means of fabrication, the support edges are preferably impermeable. Moreover, in a preferred embodiment, no capillary channels are present within the support edges. The absence of capillary channels within the support edges further increases the strength of the structure. The preceding description of the support edges is equally applicable to the reinforcing strip. As previously described, the reinforcing strip provides additional strength (and optionally rigidity) to the membrane sheet which can facilitate manufacturing and handling of the membrane sheet, construction of the filtration module, and use of the module.

As previously described, the support edges and reinforcing strip may optionally include an undulating surface. The undulating surface may be created by way of a press, embossing die or roller or similar means just after the membrane sheet has been extruded and while the support edges and reinforcing strip remain soft. Alternatively, the undulating surface may be created by applying beads or droplets of a polymer which subsequently hardens to form a projection. In yet another embodiment, the undulating surface is created by adhering projecting structures directly to the support edges and/or reinforcing strip.

The diameter and shape of the capillary channels is not particularly limited; however, the channels are preferably elliptical, (e.g. circular cross-section) with a diameter of from about 0.5 to 4 mm and a center-to-center spacing preferably from 0.5 to 5 mm, more preferably from 1 to 4 mm.

The shape and dimension of the membrane sheet are also not particularly limited; however, in preferred embodiments the membrane sheet is rectangular with a length from about 500 to 2000 mm (preferably about 1000 to 1500 mm), a width from about 100 to 1000 mm (preferably about 400 to 600 mm), with an average thickness of from about 3 to 15 mm (preferably about 3 to 10 mm). The thickness of the membrane sheet is preferably at least 1 and more preferably at least 2 mm greater than the diameter of the capillary channels. While not required, the thickness of the membrane sheet is preferably relatively uniform, (e.g. varies by less than about 10% from the overall average). The undulating surface which may optionally be provided on the support edges and reinforcing strip preferably includes peaks or projections extending outward from the membrane sheet about 0.5 to 5 mm. As will be described, the undulating surface can facilitate spacing of membrane sheets when multiple filtration modules are positioned in side-to-side arrangement as part of a filtration assembly.

FIG. 4 illustrates an embodiment of a filtration assembly generally shown at 46, submerged in a body of feed water which is subject to ambient pressure, such as a pond or open tank. The filtration assembly (46) comprises a plurality of filtration modules positioned in side-by-side arrangement with spacing between vertically-aligned membrane sheets (12). The average spacing between the surfaces of membrane sheets (12), preferably from about 2 to 12 mm, defines a fluid flow pathway generally indicated by upwardly pointing arrows. As will be subsequently described, the fluid flow pathway is unconfined along the top edges (20) of the individual membrane sheets (12). Each filtration module comprises a first (38) and second (40) header aligned along a corresponding first and second lateral edge of a membrane sheet in a manner similar to the embodiment illustrated in FIG. 2. While not shown, each membrane sheet (12) includes a plurality of capillary channels in fluid communication with the headers aligned at each lateral edge of the membrane sheet. The headers may be similar to the embodiment illustrated in FIG. 1, albeit vertically positioned rather than horizontally. Thus, when positioned (and secured) in side-by-side relationship as shown, the chambers (not shown) of adjacently positioned headers are in fluid communication with each other. Permeate outlets (48) extending from terminal headers on each end of the assembly provide routes for transferring permeate from the filtration modules. In one preferred embodiment, the permeate outlet (48) is in fluid communication with a pump (not shown) which creates negative pressure (vacuum), and which draws permeate from the headers. The negative pressure is communicated to the outer surfaces of the membrane sheets and creates a transmembrane pressure necessary for filtration (as generally depicted by curved arrows in FIG. 2). That is, negative pressure generated by a pump creates a transmembrane pressure which induces flow of permeate through the porous structure of the membrane sheet and into the capillary channels, to the chambers of individual headers, through the permeate outlet (48) where permeate can then be collected, stored or used. By reversing the pressure generated by the pump, or by use of a separate pump, stored permeate may be backwashed through the filtration assembly.

The filtration assembly may optionally include an aeration device (50) located below the filtration modules for delivering gas bubbles (52) generated by an external pump and gas source (not shown) into the feed source. The gas (preferably air) bubbles are delivered to the feed source by a series of pipes (54) with apertures (56) or nozzles. As the bubbles (52) exit the apertures (56), they rise vertically within the feed source along the fluid flow pathway defined by the spacing between vertically-aligned membrane sheets. As the bubbles (52) pass along the fluid flow pathway, they effectively scrub the outer surfaces of the membrane sheets and at least partially remove accumulated solids from the porous structure of the membrane sheets. In preferred embodiments, the fluid flow pathway is unconfined at the top edge (20) of the membrane sheets. That is, the top edge (20) of the membrane sheets are free of headers or other structures that appreciably reduce the space between adjacent membrane sheets. Said another way, the fluid flow pathway is preferably unrestricted along the top edge of the membrane sheets. Additionally, the average spacing between the surfaces of adjacent membrane sheets is preferably maintained at a distance from 2 to 12 mm, and more preferably from 3 to 7 mm. In other embodiments, the average spacing is less than 6 mm and in some embodiments less than 4 mm. The spacing between adjacent membrane sheets is preferably uniform, i.e. deviating from the spacing at the header by less than 50% and more preferably less than 25%. That is, the spacing of the membrane sheets is fixed at the headers but can vary at remote locations due to flexing. Such movement or flexing of the membrane sheet is preferably limited such that spacing at any specific point deviates by less than 50% from the spacing at the headers. The aforementioned undulating surfaces (not shown) which may optionally be provided along the support edges (e.g. edge 22) and/or reinforcing strip (36) facilitate more uniform spacing between adjacent membrane sheets even as gas bubble and feed flow tend to move and flex individual membrane sheets.

The filtration assembly preferably has a relatively high packing density. More specifically, the assembly preferably has a membrane specific surface area of at least 150/m, and in some embodiments at least 200/m. For purposes of the present description, the term "specific surface area" means the active membrane area of the assembly per unit volume. The "active membrane area" means the outer surfaces of the membrane which are porous and in fluid communication with the capillary channels. Thus, the use of non-porous laminates, support edges and reinforcing strips are excluded from the "active membrane area". The volume of the assembly includes the region within the edges of the membranes sheets (located between the terminal membrane sheets at each end of the assembly). Thus, the volume includes the spacing between individual membrane sheets. The use of the present membrane sheets allows for closer spacing of membrane sheets.

FIG. 5 is a cut-away view taken along line 5-5 of FIG. 4 showing two adjacently positioned filtration modules including vertically aligned membrane sheets (12, 12') with first and second headers (38, 40; 38', 40'). The membrane sheets (12, 12') are similar to the embodiment illustrated in FIG. 3. FIG. 5 illustrates the role of the undulating surface (44, 44') in providing spacing between adjacently positioned membrane sheets (12, 12'). More specifically, the projections (44, 44') extending from the reinforcing strip and bottom edge (best shown at 36 and 22 in FIG. 3) of adjacent membrane sheets line up and contact each other, thereby providing a predetermined spacing. The undulating surface may be provided on both sides of membrane sheets to provide proper spacing throughout a filtration assembly. While the undulating surface may also be provided along the top edge of the membrane sheet, in many preferred embodiments the top edge remains smooth and is unconfined or otherwise constrained so as to not impede the fluid flow pathway extending vertically upward between adjacent, vertically-aligned membrane sheets.

FIG. 6 is an enlarged sectional view taken from FIG. 5 illustrating the membrane sheet (12) located with a slot (30) within the header (40), including a laminate (35) disposed on the lateral edge along with sealant (34). The laminate is optional but can be used to protect the membrane sheet from direct contact with the sealant, and/or to provide stress relief to the sheet at the interface with the header. The laminate may comprise a strip of pressure sensitive tape or other reinforcing member which is secured to the edge of the membrane sheet.

While principles of the invention are amenable to various modifications and alternative forms, particular species have been described by way of examples and detailed description. It should be understood that the intent of this description is not to limit the invention to the particular embodiments described or examples provided, but rather to cover all modifications, equivalents, and alternatives falling within the spirit and scope of the disclosure. While described as being submerged in a feed source which is subject to ambient pressure, the subject filtration modules and filtration assembly may be also used in closed or pressurized tanks. Similarly, transmembrane pressure may be created by head pressure resulting from submersion of the assembly within a feed source subject to ambient pressure. Many embodiments of the invention have been described and in some instances certain embodiments, selections, ranges, constituents, or other features have been characterized as being "preferred." Characterizations of "preferred" features should in no way be interpreted as designated such features as being required, essential or critical to the invention. It will be understood that certain features and sub-combinations are of utility and may be employed without reference to other features and sub-combinations. References to ranges of numerical values expressly include the end points of such ranges.

The entire subject matter of each U.S. patent reference mentioned herein is incorporated by reference.

The invention claimed is:

1. A liquid filtration module (10) comprising: at least one header (14) and a polymeric membrane sheet (12) comprising:
   a first (16) and second (18) opposing outer surface bordered by four edges comprising an opposing top (20) and bottom (22) edge and an opposing first (24) and second (26) lateral edge,
   a plurality of parallel capillary channels positioned between the first (16) and second (18) outer surfaces and extending between two of the four opposing edges of the sheet (12) such that the capillary channels extend along a path parallel with two of the four edges and perpendicular with two of the four edges, and
   a bulk section comprising a porous polymeric structure (28) which provides selective fluid communication between the first (16) and second (18) outer surfaces and the capillary channels, and which has a bulk tensile strength, wherein:
   the header (14) is disposed along an edge of the membrane sheet (12) that is perpendicular with the capillary channels and is in fluid communication with the capillary channels,
   at least one of the two edges of the membrane sheet (12) extending parallel to the capillary channels has a tensile strength at least twice as great as the bulk tensile strength, and
   wherein the outer surfaces, (16, 18) capillary channels, bulk section, and all four edges (20, 22, 24, 26) of the polymeric membrane sheet (12) are formed by co-extrusion and form an integral extruded structure.

2. The filtration module of claim 1 wherein at least one of the edges of the membrane sheet which is parallel to the capillary channels comprises a different polymer composition than the bulk section of the membrane sheet.

3. The filtration module of claim 1 wherein at least one of the edges of the membrane sheet which is parallel to the capillary channels comprises a non-porous structure.

4. The filtration module of claim 1 wherein at least one of the edges of the membrane sheet which is parallel to the capillary channels comprises an undulating surface.

5. The filtration module of claim 1 wherein the membrane sheet further comprises a co-extruded reinforcing strip located between two opposing edges that extend in a path parallel to the capillary channels, and wherein the reinforcing strip has a tensile strength at least twice as great as the bulk tensile strength of the membrane sheet.

6. The filtration module of claim 1 wherein the membrane sheet further comprises a reinforcing laminate disposed upon a portion of at least one outer surface of the membrane and extending in a direction perpendicular to the capillary channels.

7. The filtration module of claim 1 comprising two headers, wherein the first header is disposed along the first lateral edge of the membrane sheet and a second header is disposed along the second lateral edge of the membrane sheet, and wherein both the first and second headers are in fluid communication with the capillary channels extending between the opposing first and second lateral edges of the membrane sheet.

8. The filtration module of claim 1 wherein the capillary channels extend between the opposing top and bottom edges of the membrane sheet, the capillary channels are closed at the top edge of the membrane sheet, and the header is disposed along the bottom edge of the membrane sheet and is in fluid communication with the capillary channels.

9. A filtration assembly comprising a plurality of filtration modules of claim 1, wherein the filtration modules are positioned in side-by-side arrangement with spacing between membrane sheets, and wherein the spacing between the membrane sheets defines a fluid flow pathway which is unconfined along the top edge of the membrane sheets.

* * * * *